United States Patent Office 3,709,964
Patented Jan. 9, 1973

3,709,964
PROCESS FOR PRODUCING POLYMERIC FILM
Wilfried Florent De Geest, Berchem, Paul August Verkinderen, Edegem, and Felix Frederik De Smedt, Wilrijk, Belgium, assignors to Gevaert-Agfa N.V., Mortsel, Belgium
Filed Oct. 29, 1970, Ser. No. 85,037
Claims priority, application Great Britain, Oct. 30, 1969, 53,306/69
Int. Cl. B29d 7/02
U.S. Cl. 264—22                                        5 Claims

ABSTRACT OF THE DISCLOSURE

The operation of an extrusion arrangement wherein a discharge electrode deposits electric charges on an extruded molten film which is received on a quenching surface, is facilitated when the discharge electrode is located at the side of the film which will be received on the quenching surface.

---

The present invention relates to a process for producing polymeric film by the extrusion of a thermoplastic film forming polymer.

A common method for producing thermoplastic polymeric film is to extrude the polymeric material while it is molten through a flat or circular extrusion die. After extrusion, the resulting molten or plastic polymeric film is cast upon a moving quenching surface constituted by a cooled drum or belt, where the film is cooled sufficiently to solidify it.

In order to obtain in the mentioned process a good adhesion of the molten film to the quenching surface, it has been proposed to pass the molten film in the proximity of at least one electrode to deposit on the upper surface of the film, i.e. the surface of the film which does not contact the quenching surface, an electrostatic charge sufficient to cause the film to adhere firmly to the quenching surface.

The application of the described method for improving the adhesion of the film to the quenching surface is difficult on account of the particular position to be taken by the discharge electrode in practice.

In commonly used extruders, the molten polymer is horizontally fed to an extrusion head having an extrusion die through which the molten film is extruded vertically downwards onto the peripheral surface of a positively driven quenching drum. The quenching drum is rotated in a direction such that the film is initially carried thereby in a direction opposite to that in which the polymeric material is fed to the extrusion head, and is subsequently removed from the drum in a direction away from the extruder in order that the film may be passed through successive stations where it is stretched, heat-set, heat-relaxed, etc.

The use in such an extruder of the described method for improving adhesion between the extruded film and the quenching drum involves the following difficulties.

The extruder, is generally mounted on a carriage which is arranged for movement on the floor in a direction away from the quenching drum to facilitate maintenance, adjustment, and other operations. The discharge electrode should preferably be supported by the machine frame carrying the quenching drum, but in that case the electrode must be removed each time the extruder is moved away from and towards to the quenching drum because the electrode is in the way of the molten film curtain.

When the extrusion operation has just started the quenching drum is driven temporarily at a higher peripheral speed than the linear extrusion speed in order to obtain film of reduced thickness which can be more easily handled by the operators because it has to be manually introduced into the various stations following the quenching station, such as the stretching, the heat-setting, the heat-relaxing, and other station(s). As a consequence of the stretching, the film is drawn obliquely away from the extrusion orifice towards the concave side of the film so that it may touch the discharge electrode.

Finally, a discharge electrode used in an extrusion process needs regular maintenance because of the deposition thereon of oligomers. This maintenance is rendered difficult by the rather inaccessible position of the electrode under the horizontal extruder screw. The location of the electrode raises further problems if means is provided at the side of the film remote from the quenching surface for blowing streams of air or of an inert gas onto the film surface in order firmly to urge the film against such surface. This blowing technique improves the heat transfer between the film and the quenching surface and may be used in the quenching of relatively thick films, that is, films having a thickness in the neighbourhood of 1.5 to 2.5 mm.

It has now been found that if electrostatic charges are deposited on that side of the polymeric material which moves into contact with the quenching surface results are obtained which are as satisfactory as those obtained by depositing charges on the other side of the extruded material.

This result is quite unexpected because the electric charges which are deposited on the surface of the extruded material are normally dissipated as soon as the film surface makes contact with the quenching surface, and it is precisely from this very moment on that an effective attraction of the polymeric film to the quenching surface is required.

According to the present invention therefore, a process for producing film by extruding a molten thermoplastic film-forming, polymeric material from an extrusion die onto a moving quenching surface from which the polymeric material is subsequently removed, is characterised in that the adherence of the extruded polymeric material to the quenching surface is improved by depositing electrostatic charges on that surface of the extruded polymeric material which contacts the quenching surface. The deposition takes place at a position between the extrusion die and the quenching surface.

The deposited electrostatic charges may derive from an electrode or electrodes situated near the path of the extruded polymeric material. For example a wire or filament electrode may be used which runs parallel with the quenching surface and near to that surface of the extruded polymeric material which moves into contact with such quenching surface. In order to ensure that a sufficient potential exists between the electrode(s) and the quenching surface, the latter may be grounded. Preferably the quenching surface is galvanically connected to the ground. The galvanic connection between the quenching surface and the ground may have a resistance which is almost zero, but may in certain circumstances also have a relative high resistance so that the quenching surface is permitted to take a potential which is different from the ground potential. Further details in this respect are given in the further description of the invention.

The invention described hereinafter with reference to the accompanying drawings wherein:

FIG. 1 represents diagrammatically an extrusion apparatus for performing the method according to the invention.

FIG. 2 is the electric circuit of the arrangement.

The extrusion apparatus shown in FIG. 1 comprises an extruder 10 which is provided with a filter 11 and an extrusion head 12, a metal quenching drum 13 and a further cooling drum 14 which are rotatably journalled in the machine frame 15 and which are positively driven by means, not shown, and an electrostatic discharge electrode in the form of a wire 16 which is tensioned between two insulating supports 17 and 18 which are mounted at opposite sides of the quenching drum 13 on a vertical column of the machine frame. The extruder is mounted in conventional manner on a carriage so that it may be removed from the quenching station in the direction indicated by the arrow 22.

The electrode 16 is connected over a lead 19 to one terminal of a D.C. supply 20. The other terminal of said supply is grounded. The quenching drum 13 is galvanically connected to the ground through the bearings, the driving means, etc. said galvanic connection being represented in the figure by the lead 21 to the ground.

The wire electrode 16 may be any metallic conductor having adequate strength and dimensional stability. Appropriate materials include tungsten, nickel-iron alloys, stainless steel, platinum, etc. In the present arrangement a stainless steel wire was used which had a diameter of 0.15 mm. The electrode was disposed so that in operation the distance between the wire and the film surface amounted to 10 mm., and the deposition of charges on the film surface occurred halfway down the film path extending between the die slot at the bottom of the extrusion head and the transverse line of first contact of the film with the quenching drum.

The following example illustrates the invention.

A polyethylene terephthalate polymer having an inherent viscosity of 0.59 dl. g.$^{-1}$ and a specific density of 1.33 g. cm.$^{-3}$ was extruded at a rate of 60 kgh.$^{-1}$ through a conventional flat extrusion die having an opening of 300 by 2.5 mm., at a temperature of 290° C. The molten polymer was received on a quenching drum 13 having a diameter of 800 mm. and a width of 1100 mm. The drum is rotated at a peripheral speed of 2.28 m. min.$^{-1}$ and its surface temperature was maintained at 30° C.

The effective length of the molten film between the extrusion orifice and the transverse line of first contact with the drum amounted to 20 mm.

The appearance of the film was examined after its removal from the second cooling roller 14. It was found that when no potential was applied to the wire electrode, the film surface which was in contact with the quenching drum showed the defect known as "Venetian blind haze," i.e. a type of haze which is characterized by a plurality of small alternate clear and haze lines, and which is believed to result from entrapment of air between the film and the quenching surface. This haze makes the film of unacceptable quality in the photographic industry, since the haze does not completely disappear after the film has been biaxially stretched, heat-set and heat-relaxed.

When a D.C. potential of 8000 volts was applied from the source 20, the + output of the source being connected to the electrode 16, the film was free of the defect referred to. At the same time it was noticed that the width of the film had increased and that the edges of the film were accordingly less thickened. The current which was drawn from the source 20 amounted to $1 \times 10^{-3}$ a.

For purposes of comparison the wire electrode 16 was moved to a position at the concave upper side of the film at the same distance from the film surface, and the extrusion operation was repeated at the same D.C. potential of 8000 volts. A current of $1 \times 10^{-3}$ A was drawn from the source 20, and it was found that the effect on the film was identical to that obtained with the electrode positioned according to the present invention.

The advantages of the arrangement according to the invention are clear.

If for any reason the extruder must be moved away from the quenching roller 13 in the direction of the arrow 22, this operation may be carried out without removal of the wire 16.

If it is required in a certain process, to urge the film firmly to the quenching surface in order to improve the heat transfer, or to additionally cool the film, by means of flows of air directed onto the film surface by a blower head 23 as shown in broken lines in FIG. 1 this may be done without any difficulty being caused by the presence of the discharge electrode 16. If, on the contrary, the electrode were positioned at the upper side of the film, the difficulties of handling and positioning the electrode would be appreciable.

The maintenance of the electrode is greatly facilitated by the very accessible position thereof. This maintenance is required because of the deposition thereon of oligomers as mentioned already in the introduction of the description. We refer to United Kingdom patent specification 1,129,136 wherein different techniques are described for cleaning the wire electrode or for keeping it free from any deposition of oligomers in an extrusion process.

In the arrangement described hereinbefore, the quenching drum had a conventional mirrorlike chromium finish at its peripheral surface. It should be understood however that the quenching drum may have an electrically insulating coating, e.g. of Teflon (registered trademark) or the like, which prevents direct electrical contact between the film and the roller. The thickness of such insulating coating should preferably not exceed 0.5 mm. in order to not impede the heat transfer of the film to the quenching member, and to maintain a sufficient electrostatic attraction. An additional potential advantage of a said electrically insulating drum coating is that the electrostatic charges on the film surface are not carried off, or at least may not be carried off completely, by the contact with said drum but, on the contrary, remain on the film surface so that they may still be effective when the film is passed over the second cooling roller 14. It is evident that the possibility of successfully applying this technique also depends on the conductivity of the polymer material itself which, as known, considerably increases with the temperature.

The voltage supplied by the source 20 may have an inversed polarity, and it may also be a pulsating D.C. voltage or even an A.C. voltage. The electrostatic field gradient at the electrode must be sufficient to ionize the gaseous medium (usually air) in that region, but it should be low enough to prevent ionization of the air at the film surface because the film may be partially ruptured or occasionally even broken thereby. We refer in this respect to United States patent specification 3,427,686 wherein a method is described for preventing arcing at the film surface. According to this method the quenching drum is permitted to rise in potential at the moment of undesirable arcing so that the potential difference between the discharge electrode and the quenching drum diminishes whereby the arcing automatically ceases. When applied in conjunction with the present invention, this method would involve an insulated mounting of the quenching drum 13, and the replacement of the connection 21 by a resistive impedance sufficiently great to obtain the desired effect. We consider such a resistive connection as a galvanic connection to the ground.

The electrode 16 may have other forms which are appropriate for ionizing discharge, and we refer in this respect to knife electrodes, rods which are provided with needles, etc.

Finally, it should be understood that the method described may be used with success in the quenching of extruded films of other extruded polymeric materials. Some representative materials are polyethylene, polypropylene, copolymers thereof, polystyrene, polyvinyl-chloride, and others.

We claim:

1. In a process for producing film by extruding a film of a molten thermoplastic film-forming polymeric material from an extrusion orifice onto a moving quenching surface from which the polymeric film is subsequently removed, the improvement of depositing electrostatic charges on that surface of the extruded polymeric material which contacts the quenching surface, whereby the adherence of the film to said quenching surface is enhanced.

2. A process for producing film according to claim 1, wherein the electrostatic charges are deposited from at least one electrode situated near said film surface and maintained at an electrostatic potential difference with respect to the quenching surface of sufficient magnitude to cause said film to adhere firmly to said quenching surface, while said quenching surface is galvanically connected to the ground.

3. A process according to claim 1, wherein the molten polymeric material is supplied to said orifice in a generally lateral direction and is extruded generally vertically downwards as a film from said orifice onto a cylindrical quenching surface which is positively driven in a direction such as to carry the extruded film at least initially in a direction opposite to that in which the polymeric material is supplied to the extrusion orifice, and wherein said electrostatic charges are deposited from at least one electrode located adjacent the surface of the film facing away from the direction in which the film is initially carried by the quenching surface.

4. A process according to claim 1, wherein each such electrode is a wire electrode.

5. A process according to claim 1, wherein the polymeric material is polyethylene terephthalate.

References Cited

UNITED STATES PATENTS

| | | | |
|---|---|---|---|
| 3,223,757 | 12/1965 | Owens et al. | 264—22 |
| 3,156,752 | 11/1964 | Cope | 264—22 |
| 3,456,156 | 7/1969 | Kilby et al. | 264—22 |
| 3,427,686 | 2/1969 | Busby | 18—15 |
| 3,159,696 | 12/1964 | Hodgson, Jr. | 264—216 |
| 3,597,515 | 8/1971 | Widiger | 264—216 |

ROBERT F. WHITE, Primary Examiner

G. AUVILLE, Assistant Examiner

U.S. Cl. X.R.

264—216; 425—174, 224